United States Patent
Hyman

(10) Patent No.: US 10,061,849 B2
(45) Date of Patent: Aug. 28, 2018

(54) OVERRIDE OF AUTOMATICALLY SHARED META-DATA OF MEDIA

(71) Applicant: BEATS MUSIC, LLC, San Francisco, CA (US)

(72) Inventor: David Hyman, Kensington, CA (US)

(73) Assignee: Beats Music, LLC, San Francisco, CA (US)

( * ) Notice: Subject to any disclaimer, the term of this patent is extended or adjusted under 35 U.S.C. 154(b) by 421 days.

(21) Appl. No.: 14/462,202

(22) Filed: Aug. 18, 2014

(65) Prior Publication Data
US 2014/0358927 A1   Dec. 4, 2014

Related U.S. Application Data

(63) Continuation of application No. 11/376,049, filed on Mar. 15, 2006, now Pat. No. 8,812,580.

(51) Int. Cl.
*G06F 17/00* (2006.01)
*G06F 17/30* (2006.01)

(52) U.S. Cl.
CPC .. *G06F 17/30772* (2013.01); *G06F 17/30035* (2013.01); *G06F 17/30053* (2013.01)

(58) Field of Classification Search
CPC ........... G06F 17/3005; G06F 17/30056; G06F 17/30899; G06F 17/30766; G06F 17/30772
See application file for complete search history.

(56) References Cited

U.S. PATENT DOCUMENTS

| | | |
|---|---|---|
| 5,987,525 A | 11/1999 | Roberts et al. |
| 6,061,680 A | 5/2000 | Scherf et al. |
| 6,154,773 A | 11/2000 | Roberts et al. |
| 6,161,132 A | 12/2000 | Roberts et al. |
| 6,230,192 B1 | 5/2001 | Roberts et al. |
| 6,230,207 B1 | 5/2001 | Roberts et al. |
| 6,240,459 B1 | 5/2001 | Roberts et al. |
| 6,304,523 B1 | 10/2001 | Jones et al. |
| 6,330,593 B1 | 12/2001 | Roberts et al. |
| 6,526,411 B1 | 2/2003 | Ward |

(Continued)

OTHER PUBLICATIONS

"Artists and Labels: Promote your music for free using Last.fm," www.last.fml., Feb. 10, 2006, 2 pages.

*Primary Examiner* — Truong Vo
(74) *Attorney, Agent, or Firm* — Blank Rome LLP

(57) ABSTRACT

An override of automatically shared meta-data of media method and apparatus are disclosed. In one embodiment, a method of a server device includes automatically populating a hierarchy using a play-list history data associated with a media data of a client device, and modifying the hierarchy based on a user override. The hierarchy may be a hierarchy of the play-list history data of certain items associated with the media data of the client device. A modified hierarchy may be generated based on an addition, deletion and/or an adjust modifying operation of the user override on the hierarchy, and may be automatically populated on a new mark-up language file. A new compatibility rating may be determined between the user and the other users based on the similar attributes between the modified hierarchy and the other hierarchies, and each user may be enabled to view mark-up language files of the other users.

20 Claims, 13 Drawing Sheets

(56) References Cited

U.S. PATENT DOCUMENTS

| | | | |
|---|---|---|---|
| 6,662,231 B1 | 12/2003 | Drosset et al. | |
| 6,959,319 B1 | 10/2005 | Huang et al. | |
| 7,219,123 B1 | 5/2007 | Flechter et al. | |
| 7,321,923 B1 * | 1/2008 | Rosenberg | G11B 27/034 |
| | | | 707/999.104 |
| 7,345,232 B2 | 3/2008 | Toivonen et al. | |
| 7,349,663 B1 | 3/2008 | Joseph | |
| 7,363,372 B2 | 4/2008 | Potenzone et al. | |
| 7,650,361 B1 | 1/2010 | Wong et al. | |
| 8,490,123 B2 | 7/2013 | Bodlaender et al. | |
| 2003/0004937 A1 * | 1/2003 | Salmenkaita | G01C 21/20 |
| 2003/0052913 A1 | 3/2003 | Barile | |
| 2003/0093793 A1 | 5/2003 | Gutta | |
| 2003/0105682 A1 * | 6/2003 | Dicker | G06Q 30/02 |
| | | | 705/26.8 |
| 2003/0149612 A1 | 8/2003 | Berghofer | |
| 2005/0193002 A1 | 9/2005 | Souders et al. | |
| 2005/0210507 A1 | 9/2005 | Hawkins et al. | |
| 2005/0251807 A1 | 11/2005 | Weel et al. | |
| 2006/0020662 A1 | 1/2006 | Robinson | |
| 2006/0070007 A1 * | 3/2006 | Cummins | G06F 17/30398 |
| | | | 715/769 |
| 2006/0080415 A1 | 4/2006 | Tu | |
| 2006/0195516 A1 | 8/2006 | Beaupre | |
| 2006/0242661 A1 | 10/2006 | Bodlaender et al. | |
| 2007/0101279 A1 | 5/2007 | Chaudhri et al. | |
| 2007/0156679 A1 | 7/2007 | Kretz et al. | |
| 2007/0156732 A1 * | 7/2007 | Surendran | G06Q 10/107 |

\* cited by examiner

OVERRIDE OF AUTOMATICALLY SHARED META-DATA OF MEDIA

CROSS-REFERENCE TO RELATED APPLICATION

This application is a Continuation of Non-Provisional application Ser. No. 11/376,049, filed Mar. 15, 2006, which is hereby incorporated by reference herein in its entirety.

FIELD OF TECHNOLOGY

This disclosure relates generally to the technical fields of software, database, and/or hardware technology and, in one example embodiment, to override of automatically shared meta-data of media.

BACKGROUND

A user (e.g., a music fan, a movie patron, a computer gaming patron, an e-book reader) may share information about their media preferences (e.g., musical, theatrical, artistic, cultural, hobby, etc.) and their activities (e.g., recent behaviors, likings, tastes) through a variety of mechanisms (e.g., through a web page). For example, the user may share information about their media preferences by communicating thoughts in a blog (e.g., a personal chronological log of thoughts published on a web page) and/or in a profile summary in a relationship network system (e.g., MySpace.com®, LinkedIn®, Friendster®, Match.com®, Plaxo®, etc).

The user may have to spend time and/or energy to write down thoughts about their media preferences in the blog and/or through the relationship network system. The user may not have a disposition (e.g., a habitual inclination, a tendency, etc.) to communicate their thoughts by writing them (e.g., typing them) in the blog and/or through the relationship network system. Furthermore, the user may not recollect what types of media (e.g., songs, games, movies, shows, etc.) they recently patronized (e.g., listened to, watched, played, read, etc). The user may have to search a data processing system (e.g., a computer system) and/or a media device (e.g., an Apple® iPod®, a mobile phone) to determine this information.

A marketing organization (e.g., a record label, a vendor, and/or a service provider) may make recommendations to the user for a new media purchase based on business analytics (e.g., transaction patterns such as those found through comparisons of habits/tendencies of similar purchasers) of the user (e.g., and/or by other users, customers, subscribers, patrons, etc. associated with the marketing organization). Such business analytics may be limited (e.g., by lack of sufficient data, accuracy, etc.) in their assessment of the user's preferences.

Furthermore, when the user is repeatedly presented with options that are not to the user's liking (e.g., the recommendations may not provide an accurate description of a user's taste in media), the user may choose to ignore and/or may lose faith in recommendations of the marketing organization. In addition, sometimes the new media presented by the marketing organization may be already owned and/or possessed by the user (e.g., causing the user to be annoyed that such an option has been recommended).

As a result, the user may verbally speak with like-minded individuals (e.g., friends, family, and/or acquaintances) to get a sense of their interests (e.g., the user may trust their recommendations more than that of the marketing organization). Verbally speaking with like-minded individuals can be a slow process because the user may have to telephone, visit, and/or socially meet with the like-minded individuals. Similarly, the user may read periodicals and/or web sites publishing information about preferences of other individuals the user admires (e.g., famous musicians, actors, authors, politicians, athletes, etc.). These periodicals and/or websites may be difficult to find and may be published infrequently. As such, the user may choose to hold off in transacting (e.g., purchasing) the new media and/may delay developing a passion (e.g., a lively and/or eager admiration of a media form, and gratuitously promoting the media form with focused interest) for the user's favorite existing media preferences.

SUMMARY

An override of automatically shared meta-data of media method and apparatus are disclosed. In one aspect, a method of a server device includes automatically populating an arrangement (e.g., a collection, a hierarchy, etc.) using a play-list history data associated with a media data of a client device and modifying the arrangement based on a user override. The arrangement may be an arrangement of the play-list history data of the certain items associated with the media data of the client device. In one embodiment, the play-list history data may be executable by interested parties as a radio station. A modified arrangement may be generated based on application of an addition, deletion and/or an adjust modifying operation of the user override on the arrangement and may be automatically populated on a new mark-up language file based on the modified arrangement.

The new mark-up language file and the modified arrangement may be associated with a particular user. In addition, the particular user may be associated with other markup language files associated with other users based on similar attributes in the modified arrangement of the particular user and other hierarchies associated with the other users. A new compatibility rating may be determined between the user and the other users based on the similar attributes between the modified arrangement and the other hierarchies and each user of the server device may be enabled to view mark-up language files of the other users. A new group may be formed between the user and at least one of the other users based on a threshold parameter of the new compatibility rating.

A modifying operation may be performed on a widget (e.g., user interface object in a graphical user interface) from a group comprising of a party widget, a personal detail widget, a tag widget, a guestbook widget, an internal messaging widget, a share widget, a photo widget, a tuned-in now widget, a post widget, a reviews widget, and/or a live event widget. A content data created using the post widget may be automatically deleted on the new mark-up language file and an artist mark-up language file, an album mark-up language file, a particular item mark-up language file, and/or a fan club mark-up language file when the modifying operation is a delete operation on the post widget.

In another aspect, a method of a client device includes communicating a media data to a server device including a play-list history data associated with the media data of the client device and allowing a user to modify contents associated to the play-list history data based on a user override. A new mark-up language file may be refreshed using a modified play-list history data associated with certain items of the media data. A user interface may be provided to allow a user to modify contents associated to the play-list history data.

In yet another aspect, a network includes a client device to modify an arrangement of a play-list history data based on a user override, and a server device to automatically update a series of mark-up language files based on a modified arrangement of the playlist history data generated by the user override. In addition the network may include a peer client device that is assigned a kin status with the client device based on similarity between the modified play-list history data of the client device and another play-list history data of the peer client device. The network may also include an admired client device to share an admired play-list history data with the client device and the peer client device.

The methods, systems, and apparatuses disclosed herein may be implemented in any means for achieving various aspects, and may be executed in a form of a machine readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

DETAILED DESCRIPTION

Figure 1:
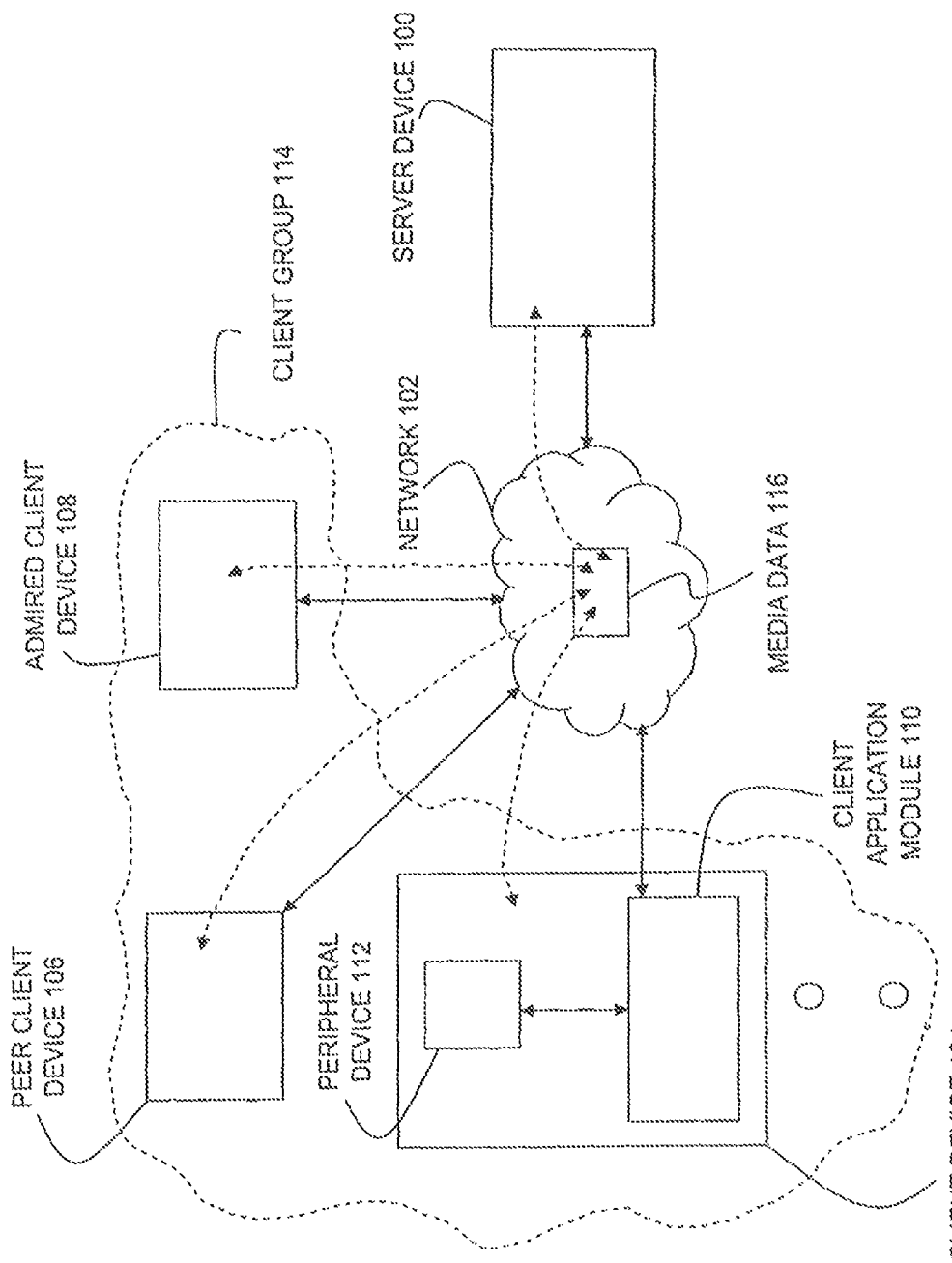
FIG. 1 is a network view of a server device, a client device, a peer client device and an admired client device communicating media data through a network, according to one embodiment.

An override of automatically shared meta-data of media method and apparatus are disclosed. In the following description, for the purposes of explanation, numerous specific details are set forth in order to provide a thorough understanding of the various embodiments. It will be evident, however to the one skilled in the art that the various embodiments may be practiced without these specific details. An example embodiment provides methods and systems of a server device 100 (e.g., as illustrated in FIG. 1) to automatically populate an arrangement (e.g., and/or any arrangement or collection such as a music collection on a hard drive) using a play-list history data (e.g., an history of media consumed by a user) associated with a media data 116 (e.g., the media data 116 of FIG. 1) of a client device 104 (e.g., as illustrated in FIG. 1) and to modify the arrangement based on a user override (e.g., by using the user interface view of the override module 212 of FIG. 2)

Another example embodiment provides methods and systems of a client device to modify an arrangement (e.g., an hierarchy) of a play-list history data based on a user override, and a server device to automatically update a series of mark-up language files based on a modified arrangement of the play-list history data generated by the user override.

An additional example embodiment provides for a network 102 which includes a client device 104 to modify an arrangement of the play-list history data through a user interface (e.g., the user interface of FIG. 10) based on a user override, and a server device 100 to automatically populate a new mark-up language file (e.g., the new mark-up language file 214 of FIG. 2) using a modified arrangement of the play-list history data based on at least one modifying operation of a user override. It will be appreciated that the various embodiments discussed herein may/may not be the same embodiment, and may be grouped into various other embodiments not explicitly disclosed herein.

FIG. 1 is a network diagram of a server device 100, a client device 104, a peer client device 106 and an admired client device 108 communicating a media data 116 through a network 102 (e.g., an Internet network, a local area network, a wide area network, etc.) according to one embodiment. In one embodiment the client device 104 may apply at least one meta-data identifier such that it is agnostic of a type of media player application (e.g., unknown of the type of media player application) compatible with the media data 116. The client device 104 may include a client application module 110 and/or a peripheral device 112 according to one embodiment. The client application module 110 may be best understood with reference to FIG. 4, as will later be described. In one embodiment the server device 100 may automatically populate a new mark-up language file (e.g., the new mark-up language file 214 of FIG. 2) using a playlist history data associated with at least some content (e.g., media content) identified by the at least one meta-data identifier.

The peer client device 106 may be assigned a kin status with the client device 104 (e.g., related to the client device 104) based on a similarity between the play-list history data of the client device 104 and another play-list history data of the peer client device 106 according to one embodiment. In one embodiment the admired client device 108 may share an admired play-list history data (e.g., a play-list history data admired by the client device 104 and/or the peer client device 106) with the client device 104 and the peer client device 106. The client device 104, the peer client device 106 and the admired client device 108 may together form a client group 114 (e.g., shown on the mark-up language file 214 by the client group display 808 of FIG. 8) based on similarities in the play-list history data. Additional details of FIG. 1 are best understood with reference to FIG. 2, FIG. 3 and FIG. 4.

Figure 2:
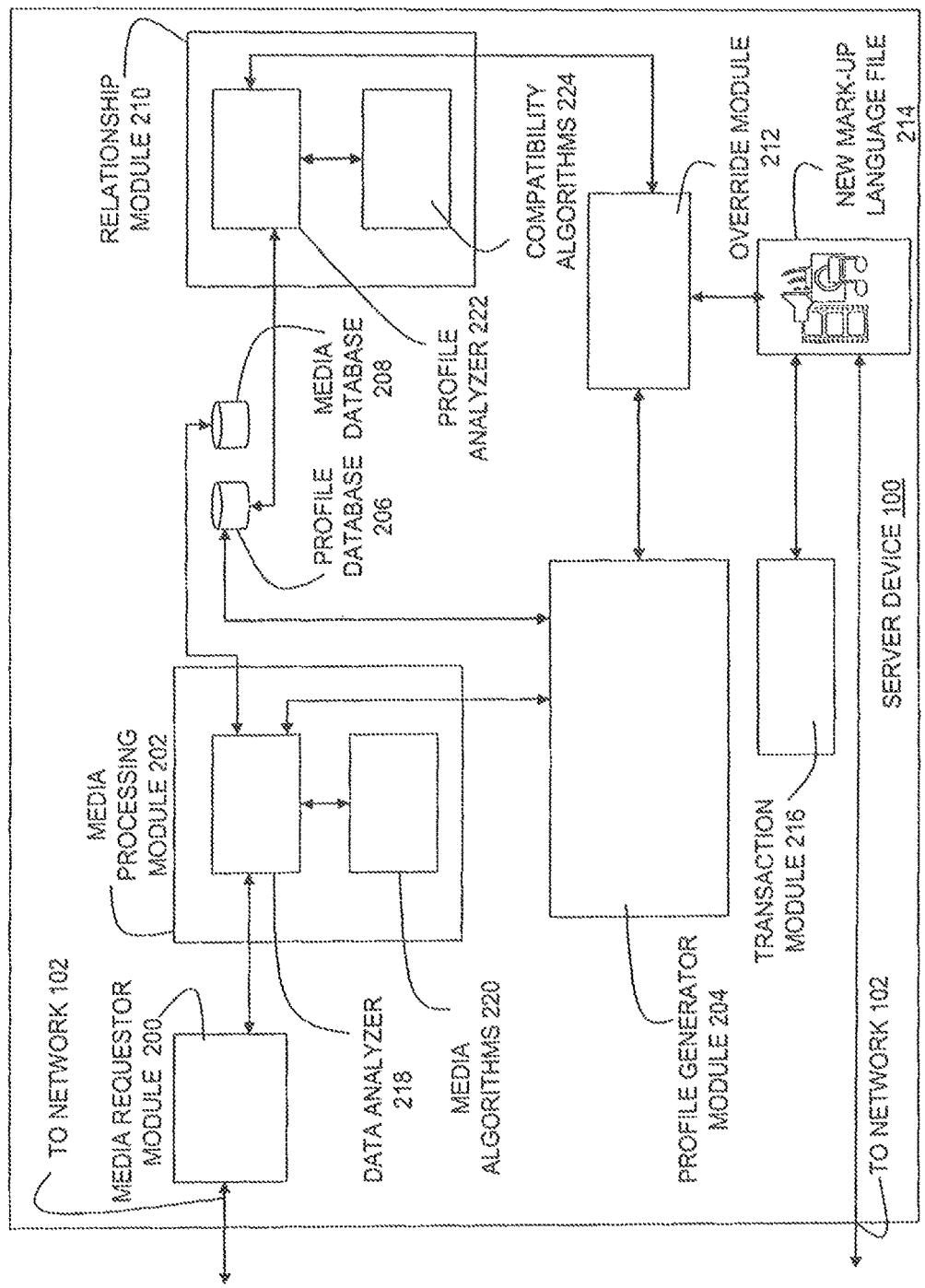
FIG. 2 is block diagram of the server device of FIG. 1, having a media requestor module, a media processing module, a profile generator module, a transaction module, and a user group generator module, according to one embodiment.

FIG. 2 is block diagram of the server device 100 of FIG. 1 having a media requestor module 200, a media processing module 202, a profile generator module 204, a user profile database 206, a media database 208, a relationship module 210, an override module 212, a transaction module 216, and a new mark-up language file 214 according to one embodiment. The media requestor module 200 may create a media data request (e.g., request for media data 116 of FIG. 1) and the server device 100 may communicate the media data request to the client device 104 through the network 102 as illustrated in FIG. 1, according to one embodiment.

In one embodiment the server device 100 analyzes the media data 116 of the client device 104 to determine at least one meta-data identifier associated with the media data 116 and automatically populates a new mark-up language file (e.g., the new mark-up language file 214 of FIG. 2) using a play-list history data associated with certain items of the media data 116. Specifically the media processing module 202 may process the media data 116 received from the client device 104. The media processing module 202 may include a data analyzer 218 and media algorithms 220. The data analyzer 218 may be used to analyze the media data 116 using a processor (e.g., such as a processor 602 of FIG. 6) to determine at least one meta-data identifier associated with the media data. The data analyzer 218 may also reference media algorithms 220 and/or a media database 208 to analyze and/or process the media data 116 communicated by the client device 104. The media data 116 received by the data analyzer 218 may be multimedia data according to one embodiment. Particularly, at least one meta-data identifier may be determined by the data analyzer 218 by referencing media algorithms 220 and/or media database 208 and carrying out a comparative analysis of the media data (e.g., a comparison of audio data embedded in the multimedia data with a known value in the media database 208) to identify content (e.g., media content) associated to the at least one meta-data identifier.

The profile generator module 204 may be used to generate a user profile (e.g., a user media profile) based on analyzing a user's media data 116 (e.g., analysis of a playlist history data associated with certain items of the media data, meta-data identifier, etc.) communicated by the client device 104 (as illustrated in FIG. 1) and associating an arrangement of the play-list history data and a new mark-up language file (e.g., the new mark-up language file 214 of FIG. 2) which may include the arrangement of the playlist history data to the user. The profile generator module 204 is best understood with reference to FIG. 3, as will later be described.

The relationship module 210 may establish relationships between a particular user profile and other user profiles by associating a particular user with other mark-up language files associated with other users based on similar attributes (e.g., songs, artists, albums, movies, genre, authors, etc.) in the arrangement (e.g., arrangement of the playlist history data) of the particular user and other hierarchies associated with other users, according to one embodiment. In one embodiment the relationship module 210 may include a profile analyzer 222 and compatibility algorithms 224. The profile analyzer 222 may reference the user profile database 206 and/or the compatibility algorithms 224 to analyze and establish relationships between a particular user profile and other user profiles. Specifically, the profile analyzer 222 may determine a compatibility rating between the user and the other users based on similar attributes (e.g., songs, artists, albums, movies, genre, authors, etc.) between the arrangement (e.g., hierarchy of the play-list history data of the user) and the other hierarchies (e.g., arrangement of the playlist history data of the other user) and enable each user of the server device 100 (illustrated in FIG. 1) to view mark-up language files (e.g., web pages) of the other users.

Figure 8:
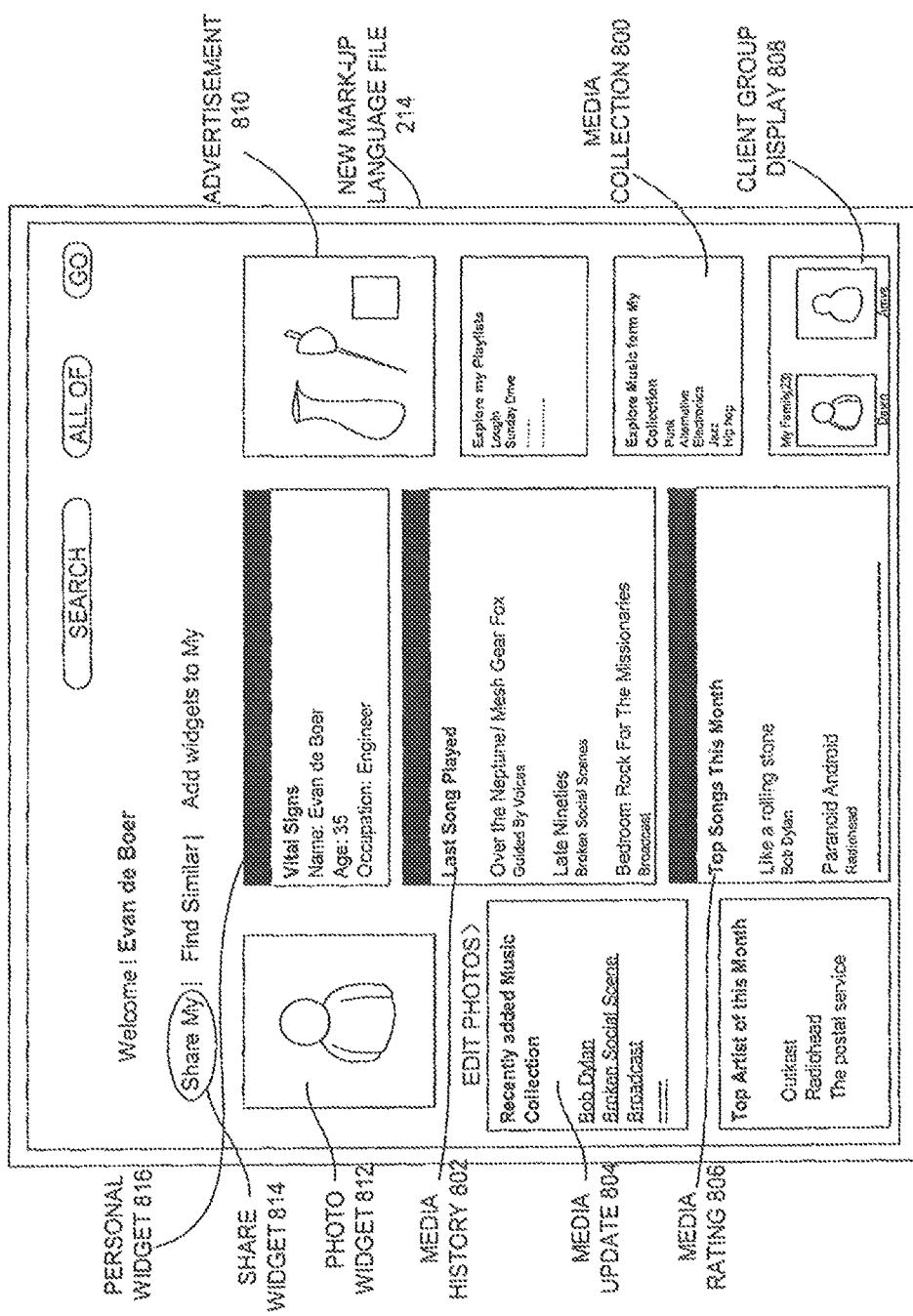
FIG. 8 is a user interface view of the new mark-up language file of FIG. 2, according to one embodiment.

In one embodiment the relationship module 210 may register (e.g., relate and/or connect) a particular one of the other users when the particular one of the other users responds to a hook data (e.g., an invitation to connect, invitation to join a group, etc.) in a communication between the user and the other users. The relationship module 210 may also form a group (e.g., the client group 114 illustrated in FIG. 1) between the user (e.g., the client device 104 of FIG. 1) and at least one of the other users (e.g., the peer client device 106 of FIG. 1) based on a threshold parameter (e.g., a certain value) of the compatibility rating. The group (e.g., the client group 114 illustrated in FIG. 1) may also include an admired user (e.g., the admired client device 108 of FIG. 1) whose contribution (e.g., play-list history data of the admired user, suggestions, media discovery, etc.) may be shared with the group. The relationship module may automatically populate details of a group (e.g., client group display 808 as illustrated in FIG. 8) to the user's mark-up language file (e.g., the new mark-up language file 214 of FIG. 2).

The override module 212 may be used to facilitate a user override (e.g., manually override automatic system settings) to modify the arrangement of the play-list history data associated with the media data 116. In one embodiment the server device 100 of FIG. 1 may generate a modified arrangement based on applying an addition (e.g., adding media content), deletion (e.g., deleting media content) and/or an adjust (e.g., changing and/or replacing media content) operation of the user override on the arrangement and automatically populating a new mark-up language file (e.g., the new mark-up language file 214 of FIG. 2) based on the modified arrangement. Specifically the arrangement of the play-list history data associated with media data 116 communicated by the profile generator module 204 may be modified with the help of a user interface (e.g., the user interface view of the override module 212 of FIG. 10) to generate a modified arrangement. This modified arrangement may then be populated on the new mark-up language file 214. For example, based on a particular user's usage pattern the system may decide a user's media history (e.g, "Summer of 69" as the last song played, etc.) or a user's media rating (e.g., Bryan Adams as the top artist this month, etc.). But the user may have consumed other media (e.g., listened to Aerosmith on a friend's computer and/or a radio station, etc.) which may not have been addressed by the system. User override allows the user to manually override the system settings and replace media content with a more accurate description of the user's media consumption (e.g., replace Bryan Adams in the example with Aerosmith). The user interface view of override module 212 is best understood with reference to FIG. 10, as will later be described.

The profile generator module 204 may then be used to generate a new user profile (e.g., a modified user profile) based on the modified arrangement. The relationship module 210 may also be used to develop new groups (e.g., like the client group display 808 of FIG. 8) and relationships based on the modified arrangement generated by the override module 212 between the user (e.g., client device 104 of FIG. 1) and at least one of the other users (e.g., peer client device 106 and/or admired client device 108) based on a threshold parameter of the new compatibility rating. Specifically a new profile (e.g., a modified user profile) for a user may be generated by associating the particular user with the new mark-up language file 214 and the modified arrangement. The particular user may also be associated with other mark-up language files associated with other users based on similar attributes (e.g., songs, artists, albums, movies, genre, authors, etc.) in the modified arrangement of the particular user and other hierarchies associated with other users. A new compatibility rating may be determined between the user and the other users based on similar attributes between the modified arrangement and the other hierarchies by a procedure similar to the one described for the relationship module 210 of FIG. 2.

In one embodiment, the modifying operation may be performed on a widget from a group comprising of a party widget, a personal detail widget (e.g., the personal detail widget 816 of FIG. 8), a tag widget (e.g., the tag widget 906 of FIG. 9), a guestbook widget, an internal messaging widget (e.g., the internal messaging widget 904 of FIG. 9), a share widget (e.g., the share widget 814 of FIG. 8), a photo widget (e.g., the photo widget 812 of FIG. 8), a tuned-in now widget (e.g., the tuned-in now widget 908 of FIG. 9), a post widget (e.g., the post widget 902 of FIG. 9), a reviews widget, and/or a live event widget. Especially when a delete operation is performed on the post widget (illustrated in FIG. 9), content data created using the post widget 902 may be automatically deleted from the new mark-up language file 214 and from an artist mark-up language file, an album mark-up language file, a particular item mark-up language file, and/or a fan club mark-up language file simultaneously. For example by deleting a particular post widget (e.g., post on Bob Dylan) from the new mark-up language file (e.g., the mark-up language file 214 of FIG. 2) the post not only gets deleted from the mark-up language file 214 but also gets deleted from the artist mark-up language file (e.g., the artist mark-up language file 900 of FIG. 9 belonging to Bob Dylan) simultaneously.

The transaction module 216 may process a payment from an interested party (e.g., vendor, service provider, etc.) when the new mark-up language file (e.g., the new markup language file 214 illustrated in FIG. 2) develops a patron base (e.g., a fan following, popularity, etc.) above a threshold value (e.g., number of hits that the new mark-up language file may receive) and may display an advertisement (e.g., the advertisement 810 in FIG. 8) of the interested party on the new mark-up language file 214.

In one embodiment, operations may begin in the server device 100 of FIG. 1 when the media data 116 requested by the media requestor module 200 from the client device 104 is received by the media processing module 202. Specifically, the media data 116 may be transmitted to data analyzer 218. The data analyzer 218 may then reference media algorithms 220 and/or media database 208 to determine the meta-data identifier and/or identify the content associated with the meta-data identifier of the media data 116 based on a comparison of the audio data embedded in the multimedia data of media data 116 with the media database 208. The profile generator module 204 may then generate a user profile based on associating the arrangement of the play-list history data of the media data and the new mark-up language file with the user. The user profile may be stored in the user profile database 206. The profile generator module 204 may further process the media data and automatically populate it on the new markup language file (e.g., based on the widgets selected by the user though the widget select module 310 as described later in FIG. 3).

Figure 3:
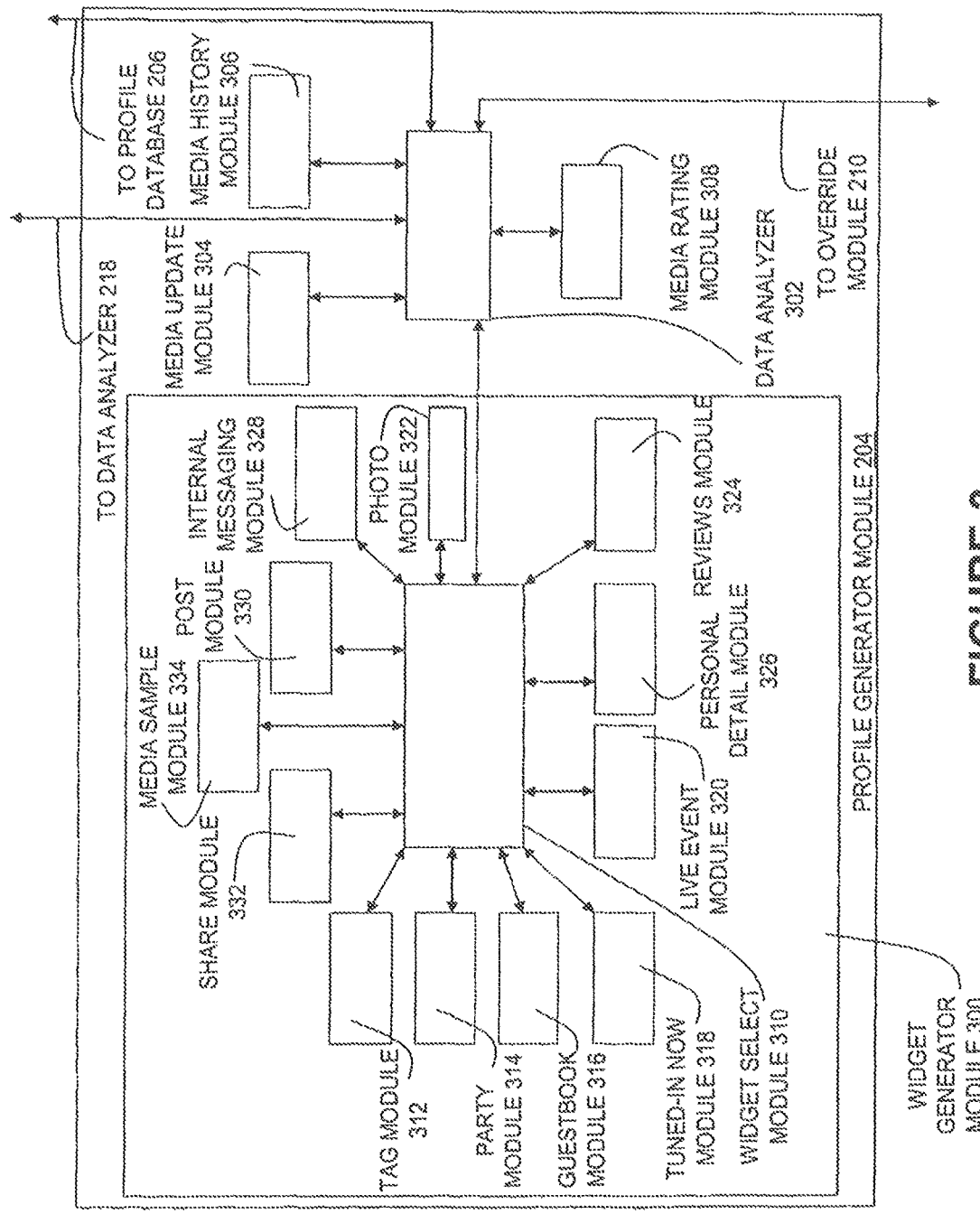
FIG. 3 is an exploded view of the profile generator module of FIG. 2, according to one embodiment.

FIG. 3 is an exploded view of the profile generator module 204 of FIG. 2 having a widget generator module 300, a data analyzer 302, a media update module 304, a media history module 306 and a media rating module 308, according to one embodiment. The widget generator module 300 may be used to generate and apply widgets chosen (e.g., based on a preference of a user) from a group of widgets (e.g., a party widget, a personal details widget, a guestbook widget, an internal messaging widget, a share widget, a photo widget, a tuned-in now widget, a post widget, a reviews widget, a live event widget, and/or a media sample widget, etc.) to the new mark-up language file (e.g., the new markup language file 214 of FIG. 2).

According to one embodiment the widget generator module 300 may include a widget select module 310, a tag module 312, a party module 314, a guestbook module 316, a tuned-in now module 318, a live event module 320, a photo module 322, a reviews module 324, a personal detail module 326, an internal messaging module 328, a post module 330, a share module 332 and a media sample module 334. The widget select module 310 may provide a user interface for selecting widgets. The widget select module 310 is best understood with reference to FIG. 7, as will later be described.

The tag module 312 may be used to generate a tag widget (e.g., the tag widget 906 of FIG. 9) to allow a user to avail the tag feature (e.g., display top tags, tag a song, etc.) in the new mark-up language file 214 (illustrated in FIG. 2). The party module 314 may be used to generate a party widget to allow a user to publicize party information (e.g., parties hosted next week, top parties, etc.) through the new mark-up language file 214. The guestbook module 315 may be used to generate a guestbook widget to allow a user to receive comments (e.g., related to the users page, suggestions, etc.) from other users through the new mark-up language file 214. The tuned-in now module 318 may be used to generate a tuned-in now widget (e.g., the tuned-in now widget 908 of FIG. 9) which may be displayed on a artist mark-up language file (e.g., the artist mark-up language file 900 of FIG. 9), an album mark-up language file, a particular item markup language file and/or a fan club mark-up language file to provide a user with information about other users availing similar media content (e.g., other users tuned in to the same song, album, artist, etc.) in real time. The live event module 320 may be used to generate a live event widget to allow a user to provide information regarding live events (e.g., live events happening this week, best live events in the country, etc.) on the new mark-up language file 214. The photo module 322 may be used to generate a photo widget (e.g., the photo widget 812 of FIG. 8) to permit a user to upload a picture to the new mark-up language file 214.

The reviews module 324 may be used to generate a reviews widget to allow a user to review media (e.g., review a song, artist, album, etc.) on the artist mark-up language file, the album markup language file, the particular item mark-up language file, the fan club mark-up language file and/or the new mark-up language file 214. The personal detail module 326 may be used to generate a personal detail widget (e.g., the personal detail widget 816 of FIG. 8) to allow a user to share personal information (e.g., Name, Age, Sex, etc.) on the new mark-up language file 214. The internal messaging module 328 may be used to generate an internal messaging widget (e.g., the internal messaging widget 904 of FIG. 9) to permit a user to communicate to other users on the server device 100 (e.g., the server device 100 of FIG. 1) through the new mark-up language file 214. The share module 332 may be used to generate a share widget (e.g., the share widget 814 of FIG. 8) to allow a user to share his/her mark-up language file 214 with other users on the server device 100. The media sample module 334 may be used to generate a media sample widget to permit a user to sample a media segment (e.g., a 30 second media segment) of certain items (e.g., a song, a movie, etc.) of the media data 116 that is associated with the play-list history on the new mark-up language file 214. In one embodiment, the play-list history data may executable by interested parties (e.g., other users) as a radio station (e.g., and/or a video station, a multi-media channel, as a streaming video channel, etc.).

The post module 330 may be used to generate a post widget (e.g., the post widget 902 of FIG. 9) to allow a user to author (e.g., write) a post and the content of the post may be automatically displayed on the new mark-up language file 214 as well as on an artist mark-up language file, an album mark-up language file, a particular item mark-up language file and/or a fan club mark-up language file, according to one embodiment. In one embodiment the post module 330 may display the content data of the post before other content data (e.g., other content data of other posts) when a peer client device (e.g., the peer client device 106 of FIG. 1) affiliated with the client device (e.g., the client device 104 of FIG. 1) reaches the artist mark-up language file, the album mark-up language file, the particular item mark-up language file and/or the fan club mark-up language through the new mark-up language file 214. For example, when a user, say John Doe, reaches an artist mark-up language file (e.g., the artist mark-up language file 900 of FIG. 9 pertaining to Bob Dylan) through the new mark-up language file (e.g., the new mark-up language file 214 of FIG. 8 belonging to Evan de Boer), John Doe will see posts authored by Evan de Boer before other posts on the Bob Dylan page.

In one embodiment the data analyzer 302 may analyze the media data 116 and transmit it to populate the new mark-up language file 214 as per instructions communicated by the media update module 304, the media history module 306, the media rating module 308 and/or the widget select module 310. The data analyzer 302 may analyze and/or organize the media data 116 by linking the meta-data identifier determined by the media processing module 202 (illustrated in FIG. 2) with its corresponding play-list history data whose content has been identified by the meta-data identifier. The data analyzer 302 may also generate a user profile by associating an arrangement of the play-list history data and the new mark-up language file (e.g., the mark-up language file 214 of FIG. 2) which may include the arrangement of the playlist history data to a user. The data analyzer 302 may communicate the user profile to the user profile database 206 (illustrated in FIG. 2).

The media update module 304 may be used to generate a media update (e.g., the media update 804 in FIG. 8) that may be displayed on the new mark-up language file 214 to reflect any changes to the user's media collection (e.g., recent movies added to collection, new books read, etc.). The media history module 306 may be used to provide a media history (e.g., the media history 802 of FIG. 8) on the new mark-up language file 214 to provide a chronology of a user's media consumption (e.g., last songs played, last movies seen, etc.). The media rating module 308 may be used to generate a media rating (e.g., the media rating 806 of FIG. 8) on the new mark-up language file 214 based on a statistical analysis of a user's media consumption (e.g., top songs this month, top parties this month, etc.).

Figure 4:
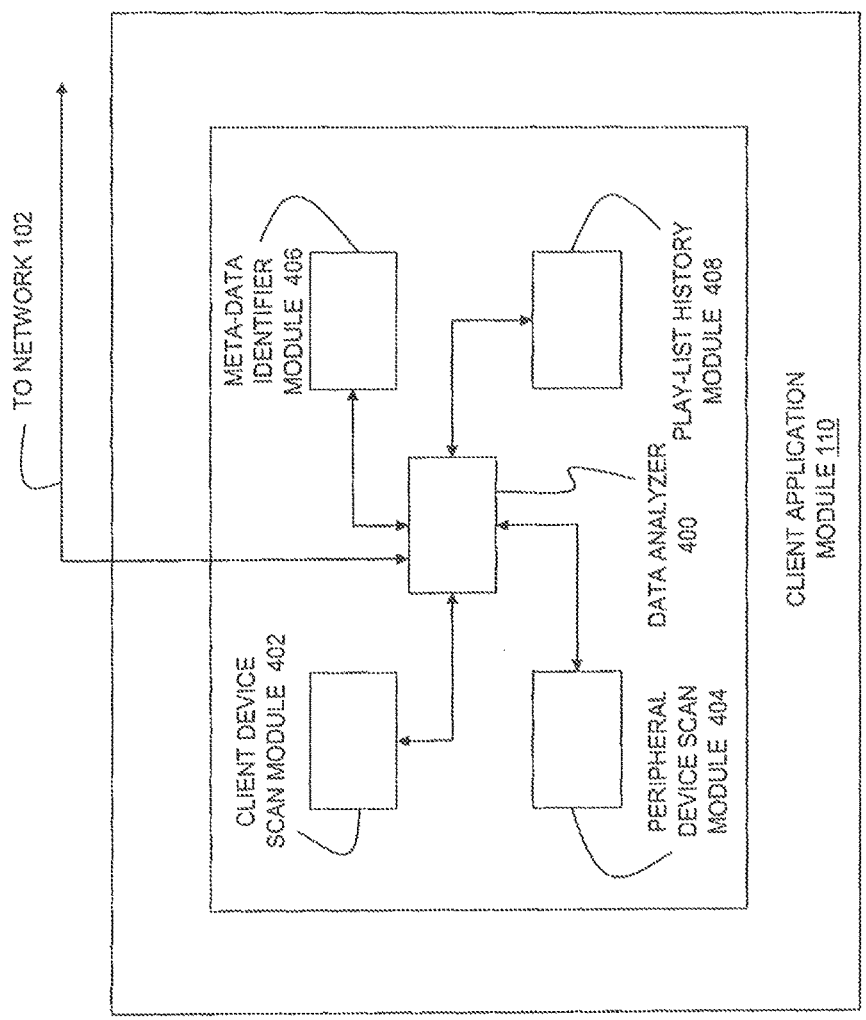
FIG. 4 is an exploded view of the client application module of FIG. 1, according to one embodiment.

FIG. 4 is an exploded view of the client application module 110 of the client device 104 of FIG. 1 having a data analyzer 400, a client device scan module 402, a peripheral device scan module 404, a meta-data identifier module 406 and a play-list history data module 408, according to one embodiment. In one embodiment the client device 104 communicates a media data (e.g., the media data 116 of FIG. 1) to a server device 100 to determine at least one meta-data identifier associated with the media data and/or automatically refreshes a new mark-up language file (e.g., the new mark-up language file 214 of FIG. 2) using a play-list history data associated with certain items of the media data 116. In particular the client application module 110 may scan a client device 104 (illustrated in FIG. 1) and/or a peripheral device 112 (illustrated in FIG. 1) for media data 116 (illustrated in FIG. 1), generate a play-list history of the media data 116, tag the media data with a meta-data identifier and/or communicate the media data 116 to a server device 100 (illustrated in FIG. 1). The client device scan module 402 may scan for media data (e.g., the media data 116 of FIG. 1) on the client device 104 which may be a two-way mobile communication device (e.g., cell phone of FIG. 5). The peripheral device scan module 404 may scan for media data (e.g., the media data 116 of FIG. 1) on the peripheral device 112 (illustrated in FIG. 1) which may be a portable media player (e.g., mp3 player of FIG. 5).

The meta-data identifier module 406 may be used to generate a meta-data identifier in a manner in which the client application module 110 may be agnostic of the type of media player application (e.g., unknown of the type of media player application) compatible with the media data 116, according to one embodiment. The meta-data identifier module 406 may then apply the meta-data identifier to tag the media data (e.g., the media data 116 of FIG. 1 obtained by scanning the client device 104 and/or the peripheral device 112) with a unique identifier in a manner in which the client device 104 may be agnostic of the type of media player application compatible with the media data.

The play-list history module 408 may generate a play-list history from the media data 116 obtained from the client device 104 and/or the peripheral device 112 based on an analysis of the usage pattern of the client device 104 and/or the peripheral device 112. The play-list history module 408 may also develop an arrangement of the play-list history data associated with the certain items of the media data 116, according to one embodiment. The data analyzer 400 may be used to analyze the media data request from the server device 100 and/or may process and compile the media data 116 (illustrated in FIG. 1) with the help of a processor (e.g., the processor 1012 of FIG. 10) by using the client device scan module 402, the peripheral device scan module 404, the meta-data identifier module 406 and/or the play-list history module 408 and communicate the media data 116 to the server device 100.

In one embodiment, operations may begin in the client device 104 of FIG. 1 when it receives a request for media data from the media requestor module 200 of FIG. 2. Specifically the media data request may be received by the data analyzer 400 of the client application module 110 of FIG. 4. The client device scan module 402 may then scan the client device for media data. Similarly the peripheral device scan module 404 may also scan the peripheral device for media data. This media data may then be received by the data analyzer 400 which may then link it to a unique meta-data identifier generated by the meta-data identifier module 406. The play-list history module 408 may develop an arrangement of the play-list history data based on an analysis of the usage pattern of the client device 104 and/or the peripheral device 112. The data analyzer 400 may analyze the play-list history data and the meta-data identifier associated to the media data, compile the media data and/or communicate the media data to the server device 100 of FIG. 1.

Figure 5:
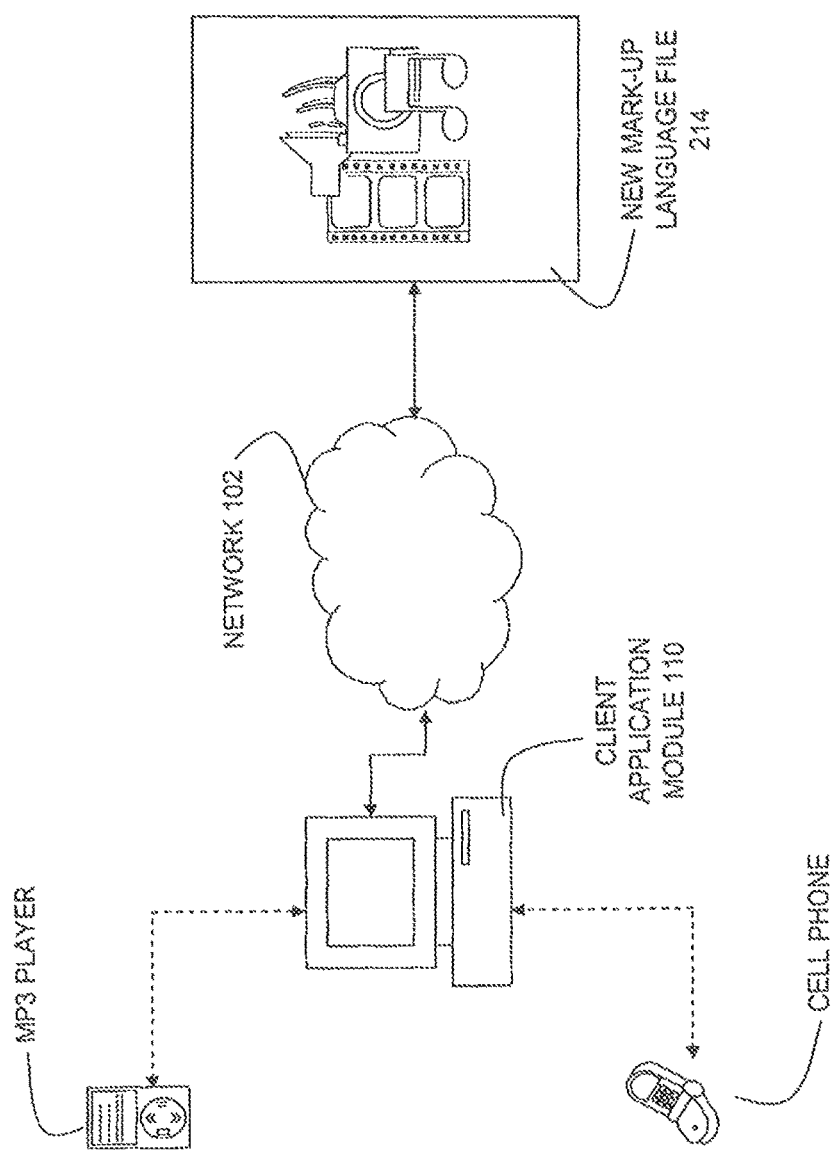
FIG. 5 is a system view of the client application module of FIG. 1 communicating media data from a peripheral device and/or a client device to a new markup language file through a network.

FIG. 5 is a system view of the client application module 110 which may extract and compile the media data 116 from a client device (e.g., a cell phone) and/or a peripheral device (e.g., an mp3 player) and/or communicate the media data 116 over a network 102 to a server device 100. The server device 100 may then process the media data 116 and/or automatically populate the same on to a new mark-up language file 214.

Figure 6:
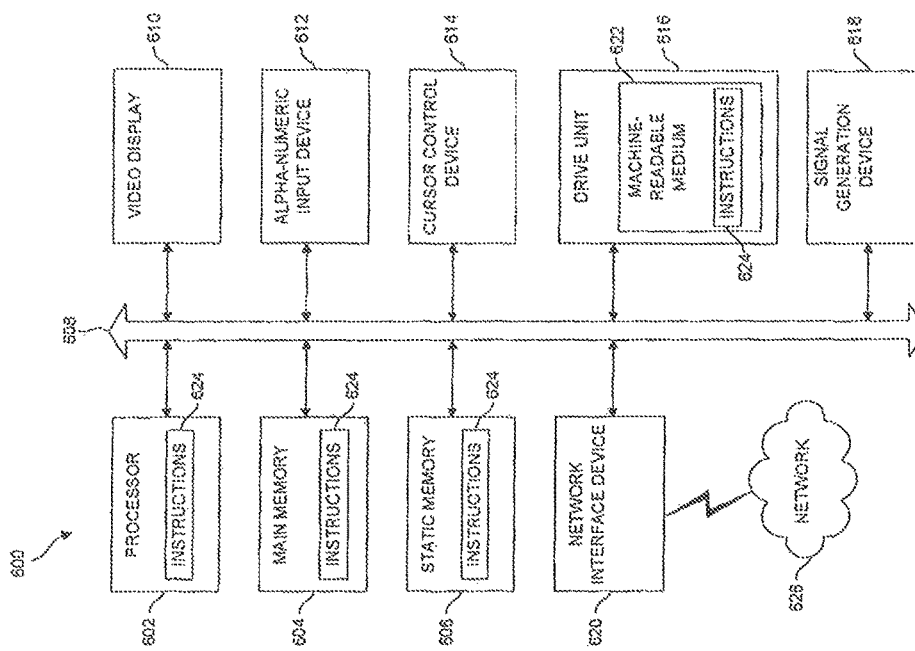
FIG. 6 is a diagrammatic representation of a data processing system capable of processing a set of instructions to perform anyone or more of the methodologies herein, according to one embodiment.

FIG. 6 shows a diagrammatic representation of machine in the example form of a computer system 600 within which a set of instructions, for causing the machine to perform anyone or more of the methodologies discussed herein, may be executed. In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment. The machine may be a personal computer (PC), a tablet PC, a set-top box (8TB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform anyone and/or more of the methodologies discussed herein.

The example computer system 600 includes a processor 602 (e.g., a central processing unit (CPU), a graphics processing unit (GPU), and/or both), a main memory 604 and a static memory 606, which communicate with each other via a bus 608. The computer system 600 may further include a video display unit 610 (e.g., a liquid crystal display (LCD) and/or a cathode ray tube (CRT). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying anyone or more of the methodologies and/or functions described herein. The software 624 may also reside, completely and/or at least partially, within the main memory 604 and/or within the processor 602 during execution thereof by the computer system 600, the main memory 604 and the processor 602 also constituting machine-readable media.

The software 624 may further be transmitted and/or received over a network 626 via the network interface device 620. While the machine-readable medium 622 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Figure 7:
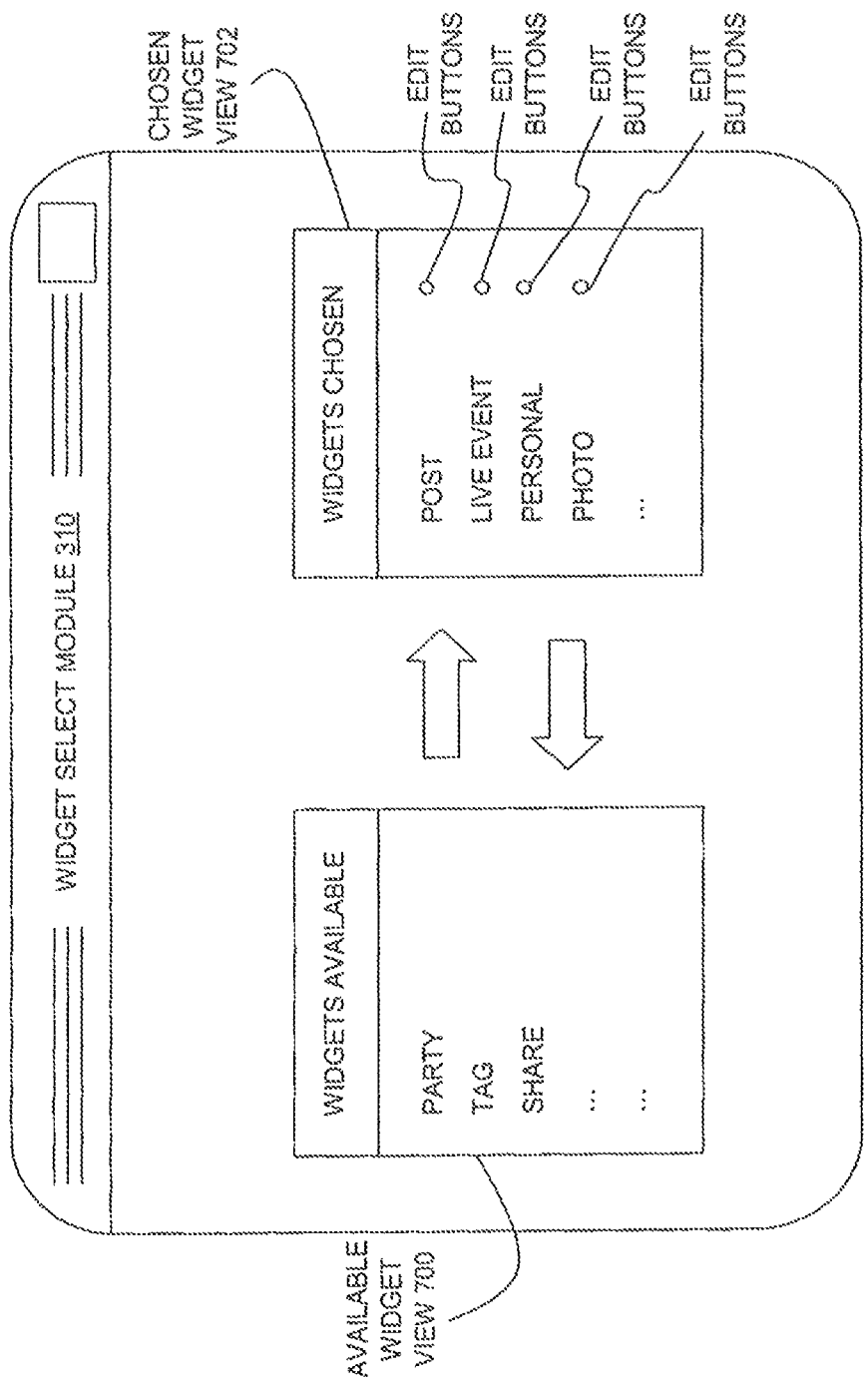
FIG. 7 is a user interface view of the widget select module of FIG. 3, according to one embodiment.

FIG. 7 is a graphical user interface view of the widget select module 310 used to select widgets for the new mark-up language file 214. Available widget view 700 shows a list of widgets that a user can pick. Chosen widget view 702 shows a list of widgets chosen from the available widget view 700. Widgets may be dragged and dropped from the available widget view 700 to the chosen widget view 702. A user can edit a particular widget using the edit buttons in the chosen widget view 702.

FIG. 8 is a graphical interface view of a new mark-up language file 214 of FIG. 2. Media collection 800 may show the entire media collection of a user. Media history 802 may show a list of media consumed by the user in a chronological order (e.g., last songs played by the user). Media update 804 may reflect any changes in the user's media collection (e.g., new media added to the user's collection). Media rating 806 may provide a rating based on a statistical analysis of the user's media consumption (e.g., top artist, top song, etc.). Client group display 808 may show list of other users connected to the user based on similarities in media consumption of the user and the other users. Advertisement 810 may be an advertisement from an interested party from whom a payment may be processed to display the advertisement on the new mark-up language file 214. Photo widget 812 may be one of the widgets that a user can select from the widget select module 310 to display a picture on the new mark-up language file 214. Share widget 814 may be a widget for a user to share his/her mark-up language file with other users on the server device 100. Personal detail widget 816 may be a widget for the user to provide his/her personal information (e.g., Name, Age, Sex, etc.) on the new mark-up language file 214.

Figure 9:
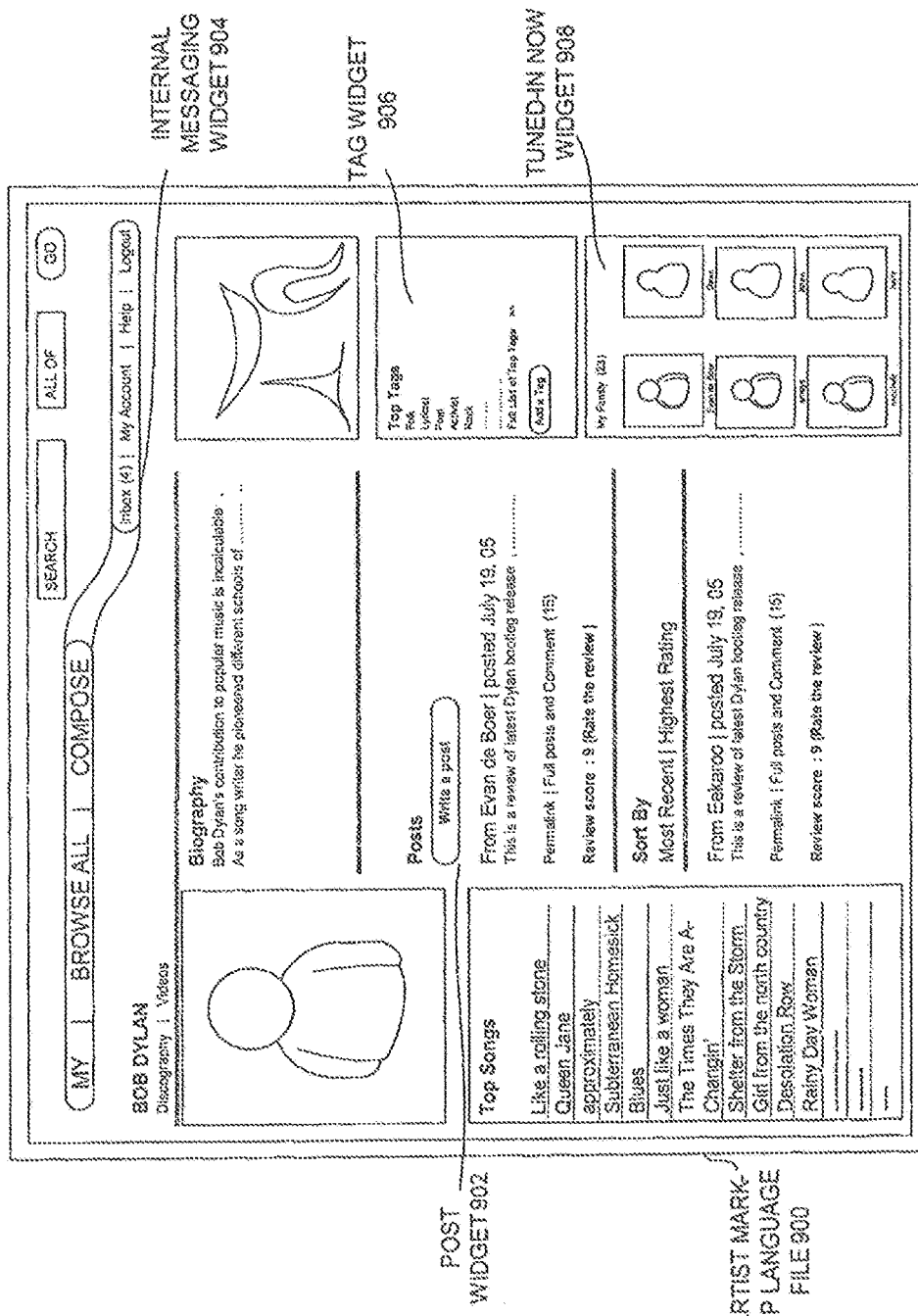
FIG. 9 is a user interface view of the artist mark-up language file, according to one embodiment.

FIG. 9 is a graphical interface view of an artist mark-up language file 900. Internal messaging widget 904 may be used to communicate with other users of the server device 100. Tag widget 906 may display a list of tags for a particular media and/or allow a user to provide a tag of his/her choice for the particular media. Tuned-in now widget 908 may display a list of users tuned-in to a particular media in real time (e.g., list of users on the server device 100 listening to a particular song in real time). Post widget 902 may allow a user to create a post on the new mark-up language file 214, the artist mark-up language file, the album mark-up language file, the particular item mark-up language file, and/or the fan club mark-up language file.

Figure 10:
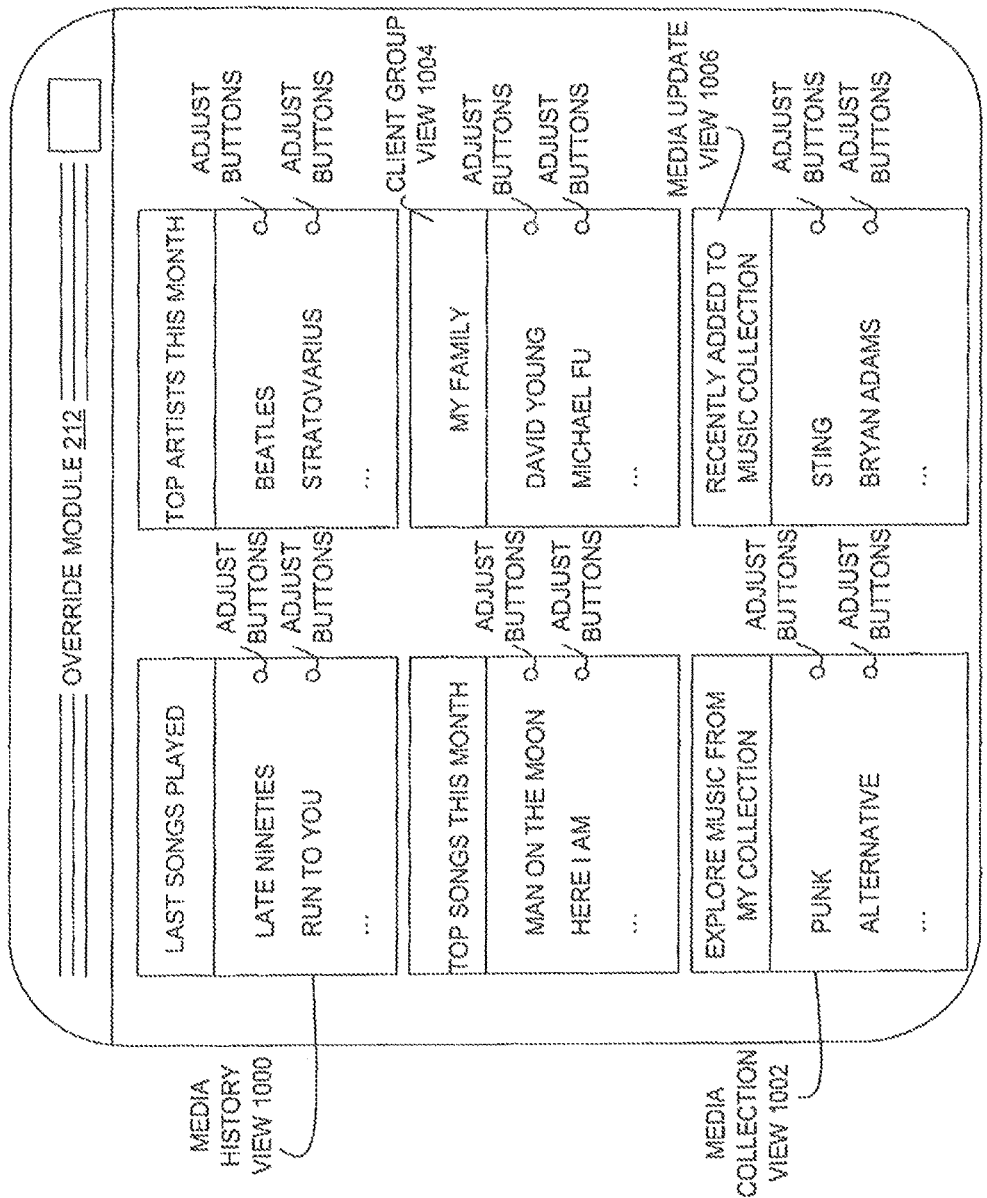
FIG. 10 is a user interface view of the override module of FIG. 2, according to one embodiment.

FIG. 10 is a graphical interface view of the override module 212 of FIG. 2. The interface may allow for a user to modify contents associated to the play-list history data (e.g., thereby generating a modified hierarchy of the play-list history data) of the media data 116. Media history view 1000 may provide a chronology of media consumed (e.g., last songs played). Media collection view 1002 may display the entire media collection held by a user. Client group view 1004 may display the group formed by the relationship module 210 of FIG. 2 based on similarities in media consumption. Media update view 1006 may display the changes in a user's media collection (e.g., recently added to music collection). The user may modify (e.g., add, delete, change and/or replace) contents with the help of adjust buttons provided in the user interface.

Figure 11:
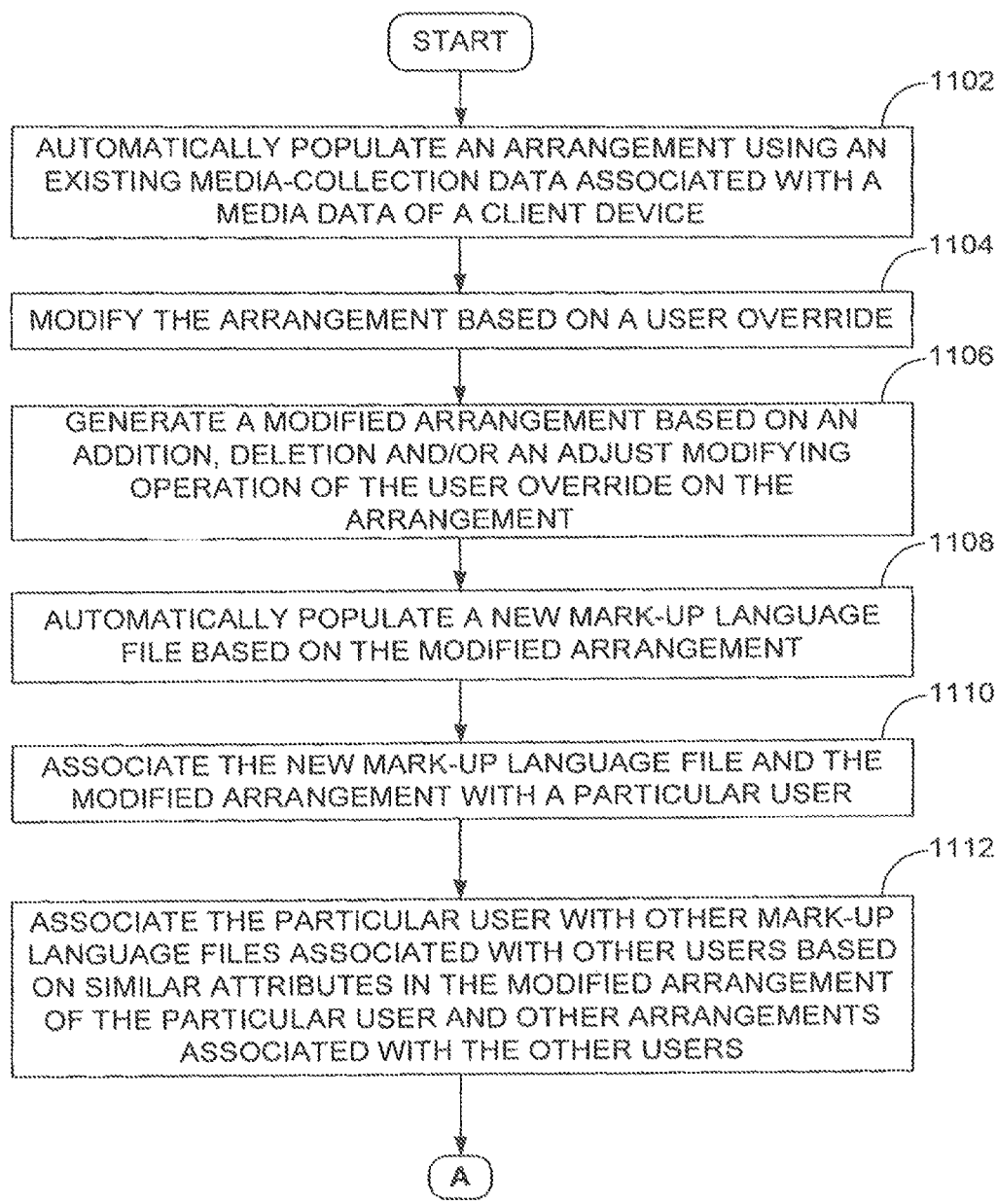
FIG. 11 is a flow chart illustrating a method of the server device of FIG. 1 to automatically populate an arrangement using a play-list history data associated with a media data of a client device and modifying the arrangement based on a user override, according to one embodiment.

FIG. 11 is a flow chart illustrating a method of the server device (illustrated in FIG. 1) to automatically populate an arrangement (e.g., a hierarchy) using a play-list history data associated with a media data (e.g., the media data 116 of FIG. 1) of a client device (illustrated in FIG. 1) and/or modifying the arrangement based on a user override, according to one embodiment. In operation 1102, an arrangement (e.g., a hierarchy) may be populated automatically using an existing media-collection data (e.g., a play-list history data) associated with a media data of a client device. In operation 1104, the arrangement may be modified based on a user override (e.g., by using the override module 212 of FIG. 2). In operation 1106, a modified arrangement (e.g., hierarchy) may be generated based on an addition, deletion and/or an adjust modifying operation of the user override on the arrangement. In operation 1108, a new mark-up language file (e.g., the new mark-up language file 214 of FIG. 2) may be automatically populated based on the modified arrangement.

In operation 1110, the new mark-up language file and the modified arrangement (e.g., hierarchy) may be associated with a particular user (e.g., by using the profile generator module 204 of FIG. 2). In operation 1112, the particular user may be associated with other mark-up language files associated with other users based on similar attributes in the modified arrangement of the particular user and the other arrangements associated with the other users.

Figure 12:
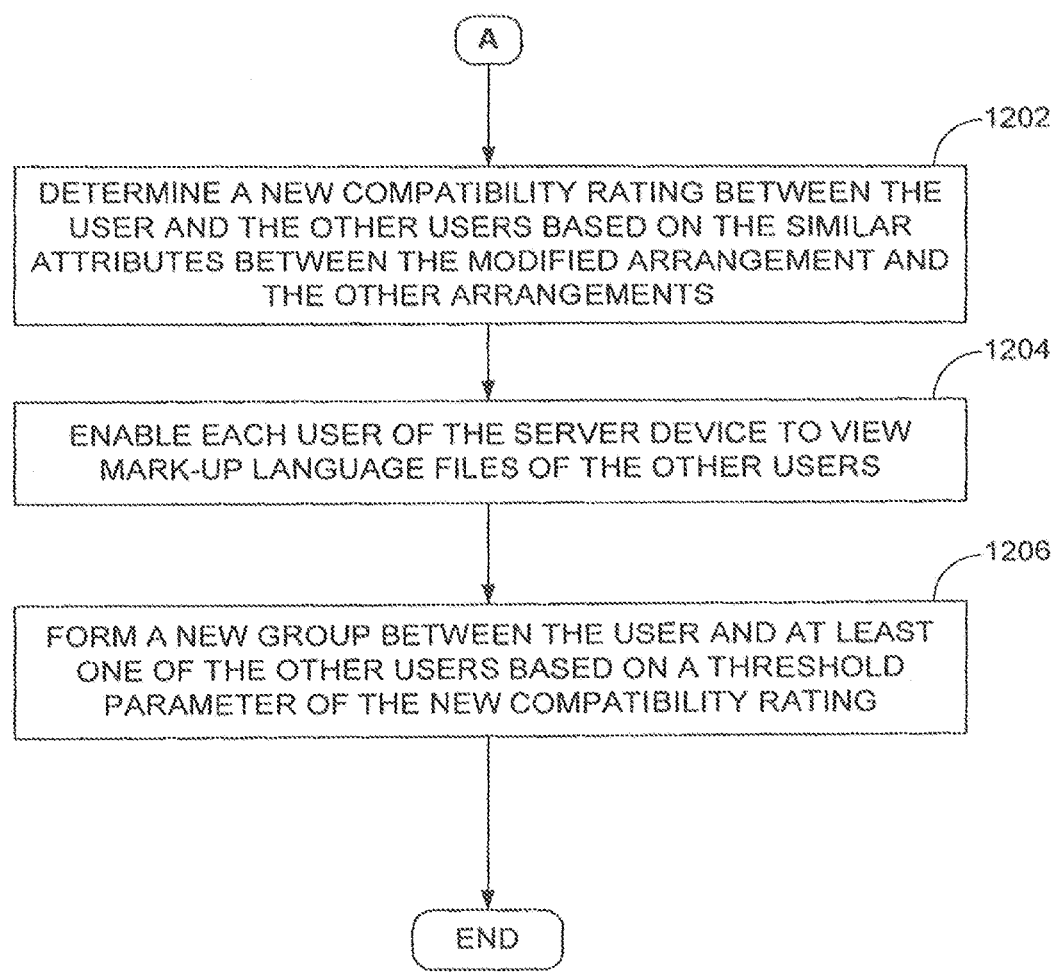
FIG. 12 is a flow chart that describes further the operations in FIG. 11, according to one embodiment.

FIG. 12 is a flow chart that describes further the operations in FIG. 11, according to one embodiment. FIG. 12 begins with a 'circle A' that connotes a continuation from operation 1112 of FIG. 11 (e.g., FIG. 11 concludes with the 'circle A'). First in operation 1202, a new compatibility rating may be determined (e.g., by using the relationship module 210 of FIG. 2) between the user and the other users based on the similar attributes between the modified arrangement (e.g., hierarchy) and the other arrangements. In operation 1204, each user of the server device may be enabled to view mark-up language files of the other users. In operation 1206, a new group (e.g., like the client group display 808 of FIG. 8) may be formed between the user and at least one of the other users based on a threshold parameter of the new compatibility rating.

Figure 13:
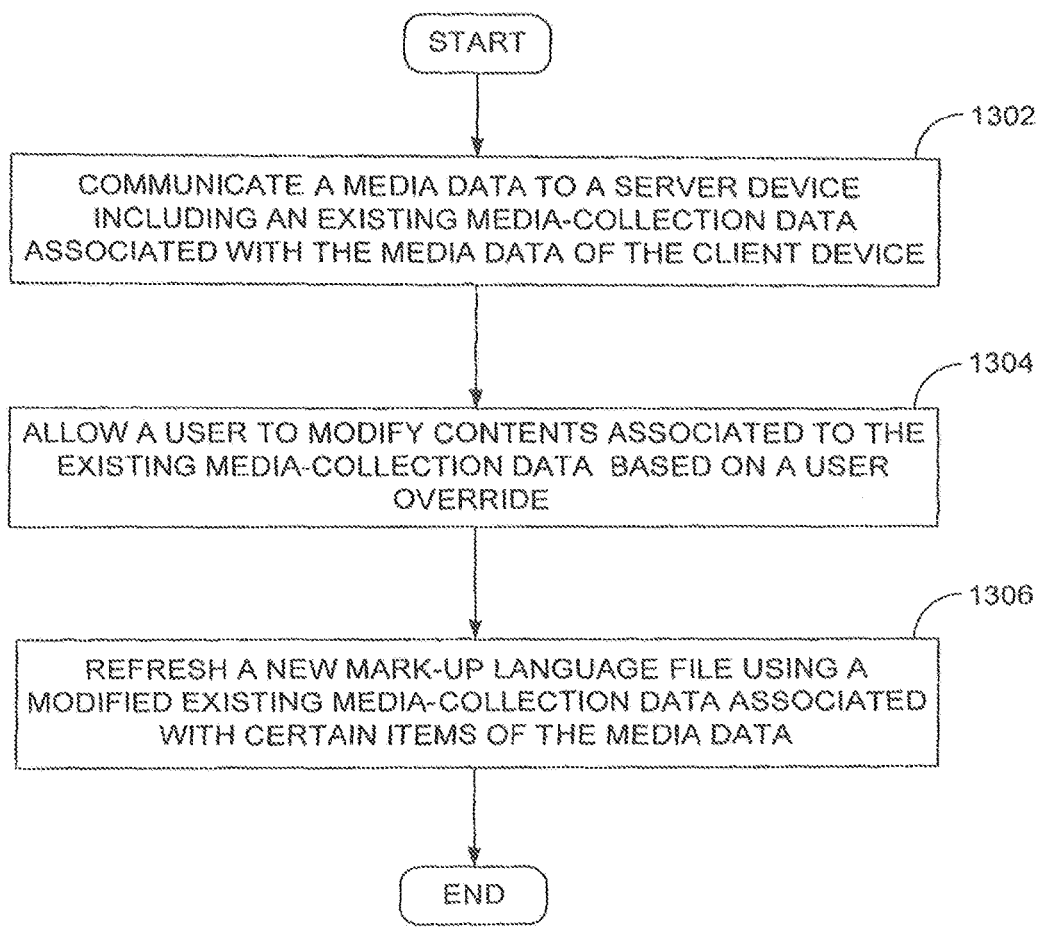
FIG. 13 is a flow chart illustrating a method of the client device of FIG. 1 to communicate media data to the server device and allow a user to modify contents associated to the play-list history data based on a user override, according to one embodiment.

FIG. 13 is a flow chart illustrating a method of the client device to communicate media data to the server device and/or allow a user to modify contents associated to the play-list history data based on a user override, according to one embodiment. In operation 1302, a media data may be communicated to a server device (e.g., as illustrated in FIG. 1) which may include an existing media-collection data (e.g., a play-list history data) associated with the media data of the client device. In operation 1304, a user may be allowed to modify contents associated to the existing media-collection data (e.g., the play-list history data) based on a user override (e.g., by using the user interface of FIG. 10). In operation 1306, a new mark-up language file (e.g., the mark-up language file 214 of FIG. 2) may be refreshed using a modified existing media-collection data (e.g., play-list history data) associated with certain items of the media data (e.g., the media data 116 of FIG. 1).

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the client application module 110 (and all the modules in the client application module 110 as illustrated in FIG. 4), the media requestor module 200, the media processing module 202, the profile generator module 204, the relationship module 210, the override module 212, the transaction module 216, the widget generator module 300 (and all the modules within the widget generator module 300), the media update module 304, the media history module 306, and/or the media rating module 308, may be enabled using transistors, logic gates, and electrical circuits (e.g., application specific integrated ASIC circuitry) using a client circuit, a media requestor circuit, a media processing circuit, a profile generator circuit, a relationship circuit, a override circuit, a transaction circuit, a widget generator circuit, a media update circuit, a media history circuit, and/or a media rating circuit.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method comprising:
outputting for display on a graphical user interface of a client device, one or more media object identifiers based on a history log of media data usage of the client device;
automatically generating an arrangement, without user interaction, of the one or more media object identifiers for display on the graphical user interface;
receiving an override operation, the override operation altering the history log of media data usage; and
automatically re-arranging the one or more media object identifiers of the arrangement in accordance with the altered history log of media data usage.

2. The method of claim 1, wherein the history log of media data usage is executable as a radio station.

3. The method of claim 1, wherein the override operation comprises at least one of an addition, deletion and adjust modifying operation.

4. The method of claim 3, further comprising:
associating the re-arranged arrangement with a particular user; and
associating the particular user with other arrangements associated with other users based on similar attributes in the one or more media object identifiers of the particular user and other media object identifiers associated with the other users.

5. The method of claim 4, further comprising:
enabling the particular user to view the other arrangements associated with the other users.

6. The method of claim 5, further comprising forming a group between the particular user and at least one of the other users based on a threshold parameter of a compatibility rating between the user and the other users based on the similar attributes.

7. The method of claim 1, wherein the media object identifiers comprise one of a party object, a personal detail object, a tag object, a guestbook object, an internal messaging object, a share object, a photo object, a tuned-in now object, a post object, a reviews object, and a live event object.

8. The method of claim 7, wherein a content data created using the post object is automatically deleted from the arrangement and deleted from at least one of an artist arrangement, an album arrangement, a particular item arrangement, and a fan club arrangement when the override operation is a delete operation.

9. The method of claim 1, wherein the history log comprises playlist history data of the client device, and wherein the arrangement is described by a mark-up language.

10. At least one non-transitory computer readable medium comprising instructions, which, when executed by at least one processor, cause the at least one processor to:
output for display on a graphical user interface of a client device, one or more automatically arranged, without user interaction, media object identifiers based on a history log of media data usage of the client device; and
automatically re-arrange the one or more media object identifiers in accordance with an override operation, the override operation altering the history log of media data usage.

11. The at least one non-transitory computer readable medium of claim 10, wherein the instructions, which, when executed by the at least one processor, cause the at least one processor to: cause a refresh of a the graphical user interface with a modified history of items of media data of the client device.

12. The at least one non-transitory computer readable medium of claim 10, wherein the override operation is facilitated by modifying media data associated with the history log.

13. A computing device comprising:
at least one processor;
at least one non-transitory computer readable medium storing instructions, which, when executed by the at least one processor, cause the at least one processor to:
output for display a graphical user interface with one or more media object identifiers automatically populated and arranged based at least in part on a history log of media data usage of a client device;
modify the history log of media data usage based on an override operation;
output for display an updated graphical user interface with the one or more media object identifiers automatically re-arranged based on the modified history log of media data usage.

14. The computing device of claim 13, further comprising:
a network adapter configured to:
communicatively couple to an admired client device; and
share an admired history log of media data usage with the admired client device.

15. The computing device of claim 13, further comprising:
a network adapter configured to communicatively couple to a peer client device, the peer client device assigned a kin status with the client device based on a similarity between the modified history log of media data usage of the client device and another history log of media data usage of the peer client device.

16. The computing device of claim 15, further comprising instructions, which, when executed by the at least one processor, cause the at least one processor to group the client device and the peer client device based on a threshold parameter of a compatibility rating, the compatibility rating generated based on the kin status.

17. The computing device of claim 13, wherein the instructions, which, when executed by the at least one processor, cause the at least one processor to modify the history log of media data usage comprise instructions, which, when executed by the at least one processor, cause the at least one processor to modify the history log of media data usage using an object chosen from a group comprising: a party object, a personal detail object, a tag object, a guestbook object, an internal messaging object, a share object, a photo object, a tuned-in now object, a post object, a reviews object, and a live event object.

18. The computing device of claim 17, wherein a content data created using the post object is automatically removed from the graphical user interface and removed from at least one of an artist graphical user interface, an album graphical user interface, a particular item graphical user interface, and a fan club graphical user interface when the modifying operation is a delete operation on the post object.

19. The computing device of claim 13, wherein the display is configured to render streaming multimedia content based on the history log of media data usage.

20. The computing device of claim 19, wherein the streaming multimedia content comprises at least one of a radio station, a video station, and a multimedia channel.

* * * * *